(12) United States Patent
Wong et al.

(10) Patent No.: US 9,303,138 B2
(45) Date of Patent: *Apr. 5, 2016

(54) ELASTOMERIC COMPOSITION FOR PHARMACEUTICAL ARTICLES

(75) Inventors: Wai K. Wong, Wezeembeek (BE); Herman P. R. Morel, Vlierzele (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/570,995

(22) Filed: Aug. 9, 2012

(65) Prior Publication Data

US 2013/0072605 A1     Mar. 21, 2013

Related U.S. Application Data

(60) Provisional application No. 61/537,245, filed on Sep. 21, 2011.

(51) Int. Cl.
| C08L 23/02 | (2006.01) |
|---|---|
| C08K 13/02 | (2006.01) |
| C08K 3/36 | (2006.01) |
| C08K 5/205 | (2006.01) |
| C08L 23/28 | (2006.01) |

(52) U.S. Cl.
CPC . *C08K 3/36* (2013.01); *C08K 5/205* (2013.01); *C08L 23/283* (2013.01); *C08L 2312/00* (2013.01)

(58) Field of Classification Search
USPC ........................................................ 524/445
See application file for complete search history.

(56) References Cited

U.S. PATENT DOCUMENTS

| 4,210,568 | A | * | 7/1980 | Makowski et al. | 524/238 |
|---|---|---|---|---|---|
| 4,607,074 | A | * | 8/1986 | Hazelton et al. | 524/425 |
| 5,051,477 | A | * | 9/1991 | Yu et al. | 525/194 |
| 5,162,445 | A |   | 11/1992 | Powers et al. | |
| 5,426,167 | A |   | 6/1995 | Powers et al. | |
| 5,459,174 | A |   | 10/1995 | Merrill et al. | |
| 5,461,118 | A | * | 10/1995 | Arjunan et al. | 525/333.5 |
| 5,654,370 | A | * | 8/1997 | Datta et al. | 525/211 |
| 6,329,450 | B1 | * | 12/2001 | Ogoe et al. | 524/35 |
| 7,226,962 | B2 | * | 6/2007 | Tsou et al. | 523/213 |
| 7,241,831 | B2 | * | 7/2007 | Waddell et al. | 524/519 |
| 2003/0013780 | A1 | * | 1/2003 | Lau et al. | 522/112 |
| 2004/0014869 | A1 | * | 1/2004 | Wong et al. | 524/493 |
| 2004/0147639 | A1 | * | 7/2004 | Tsou et al. | 523/216 |
| 2005/0027057 | A1 | * | 2/2005 | Dias et al. | 524/445 |
| 2006/0100339 | A1 | * | 5/2006 | Gong et al. | 524/445 |
| 2007/0000926 | A1 | * | 1/2007 | Jacob et al. | 220/233 |
| 2008/0015307 | A1 | * | 1/2008 | Waddell et al. | 524/578 |
| 2010/0036025 | A1 | * | 2/2010 | Rodgers et al. | 524/52 |
| 2010/0222485 | A1 | * | 9/2010 | Ouhadi | 524/426 |
| 2012/0142868 | A1 | * | 6/2012 | Konig et al. | 525/333.9 |
| 2013/0072605 | A1 | * | 3/2013 | Wong et al. | 524/198 |
| 2013/0203865 | A1 | * | 8/2013 | Wong et al. | 514/772.4 |

FOREIGN PATENT DOCUMENTS

WO    WO 2005/108422    * 11/2005

OTHER PUBLICATIONS

U.S. Appl. No. 61/537,230, filed Sep. 21, 2011, Wong et al.

* cited by examiner

*Primary Examiner* — Michael A Salvitti

(57) ABSTRACT

Elastomeric polymers and compounded elastomers have reduced amounts of leachables. The compound comprises a polymer and 50 to 100 phr of filler. The polymer is prepared by reacting a mixture of i) a $C_4$ to $C_7$ isoolefin monomer, ii) a styrene based monomer, and optionally iii) a $C_4$ to $C_{14}$ multi-olefin monomer wherein the polymer contains 5 to 15 wt % of styrene derived units. At least 5% of the filler is precipitated silica.

10 Claims, 1 Drawing Sheet

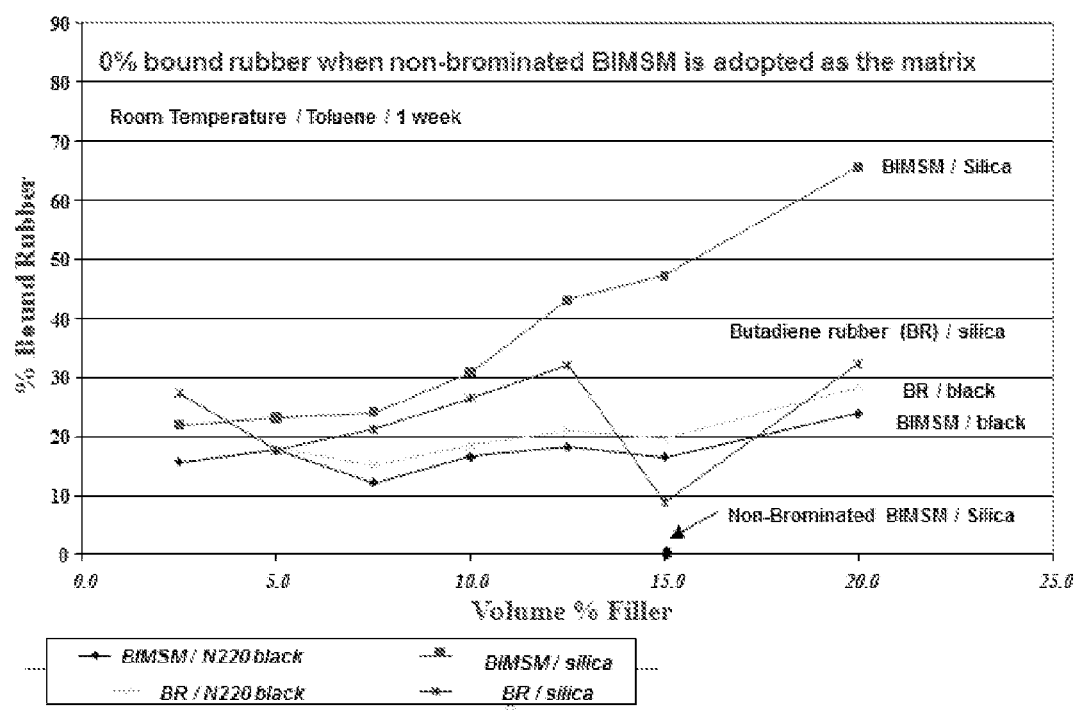

ELASTOMERIC COMPOSITION FOR PHARMACEUTICAL ARTICLES

CROSS REFERENCE TO RELATED APPLICATIONS

This application claims priority to U.S. Provisional Patent Application No. 61/537,245 filed Sep. 21, 2011, the disclosures of which are incorporated herein by reference in its entirety.

FIELD OF THE INVENTION

The present invention is directed to elastomeric compositions and pharmaceutical articles made from the elastomeric compositions. In particular, the disclosed compositions are compounded for reduced leachables.

BACKGROUND OF THE INVENTION

Filled and vulcanized elastomers are widely adopted for pharmaceutical stopper and seal applications. Elastomers have the following desirable properties: sealing and re-sealing performance, ability to be penetrated by needles without resulting in significant fragmentation, and stoppers formed from elastomers retain their physical dimensions upon high temperature sterilization. Other semi-crystalline materials, such as plastics and thermoplastic elastomers, are not able to match the elasticity, needle penetrability and dimension stability performance of amorphous elastomers. The most widely adopted elastomers for parenteral drug packaging today are halobutyl polymers due to their high gas and moisture barrier as well as low level of additives and impurities. The transition in elastomers and elastomer compositions used for the pharmaceutical applications has been driven by many factors, including the need for high cleanliness stoppers that are compatible with modern sensitive drugs, the use of high purity ingredients to minimize any chemical species that migrate out of stopper and interact with medicine (drug compatibility/turbidity), use of low amounts of clean curatives to assure drug stability/compatibility, a tight control on visible and non-visible particle contamination, and the need for low extractables/leachables.

The levels of extractable and leachable parenteral drug packaging stoppers are being regulated today. In order to achieve good drug compatibility and minimize extractable and leachable, stopper manufacturers generally use raw materials of high cleanliness, optimize formulation to contain least amount of curing agent and other additives and comply with good manufacturing practice (GMP) or other ISO standards.

High quality pharmaceutical stoppers today are largely made using halobutyl instead of regular butyl due to the versatile curing of the former elastomer. Regular butyl requires high dosage of sulfur and/or zinc containing curing agents and is not acceptable. Bromobutyl elastomer can be cured using low level of zinc-free and sulfur-free curing agents and therefore provide high degree of cleanliness.

Brominated isobutylene para-methylstyrene (BIMSM) elastomer is a very clean elastomer that has been adopted by the industry to make stoppers for packaging expensive drugs such as antibiotics, water for injection as well as vaccines and biological products. Unlike halobutyl, BIMSM elastomer has a fully saturated backbone and therefore does not need butylated hydroxylated toluene (BHT) or other antioxidant and stabilizer such as epoxidized soy bean oil (ESBO) for stabilization. The polymer also contains no oligomer, a by-product of butyl and halobutyl polymerization process. BHT, oligomer and other additives have been found to be extractables that may lead to drug incompatibility with antibiotics and other sensitive drugs. The use of natural rubber is limited due to 'latex sensitivity' issue. The use of other synthetic rubbers are hampered by high gas and moisture permeability, poor oxidation and heat resistance.

Apart from additives and by-products in the elastomer, curing agents adopted for vulcanization are major source of extractables for pharmaceutical stoppers. BIMSM can be cross-linked effectively through the benzylic bromine functional groups and requires less curative than halobutyl for effective crosslinking. Nevertheless any curing agents and processing additives used can potentially be extracted and cause drug incompatibility for sensitive drugs and biological products. Pharmaceutical stoppers also contain filler for mechanical reinforcement; calcined clay filler is widely used as clean filler by the industry.

Because of these concerns, the industry is constantly looking to find both elastomers and compounded elastomers having reduced leachables.

SUMMARY OF THE INVENTION

The present invention is directed to elastomeric polymers and compounded elastomers that have reduced amounts of leachables and improved drug compatibility.

Disclosed herein is an elastomeric composition. The composition comprises a polymer and 50 to 100 phr of filler. The polymer is prepared by reacting a mixture of i) a $C_4$ to $C_7$ isoolefin monomer, ii) a styrene based monomer, and optionally iii) a $C_4$ to $C_{14}$ multiolefin monomer wherein the polymer contains 5 to 15 wt % of styrene derived units. At least 5% of the 50 to 100 phr of the filler is precipitated silica.

In another aspect of the disclosed invention, the elastomeric composition is further comprised of a cure package.

In another aspect of the invention, the amount of precipitated silica in the total amount of filler is selected from the group consisting of 1) at least 10% 2) at least 30% 3) 5 to 80%, and 4) 10 to 60%.

In yet another aspect of the invention, the elastomeric composition has a cure package comprising carbamate. The carbamate is present in amounts selected from the group consisting of 1) not more than 2.0 phr, 2) less than 1.0 phr, and 3) 0.10 to 0.25 phr.

Also disclosed is an elastomeric pharmaceutical article. The article is comprised of a polymer, the polymer being a random polymer of; i) $C_4$ to $C_7$ isoolefin derived units; ii) 5 to 15 wt % para-methylstyrene derived units, and optionally; iii) $C_4$ to $C_{14}$ multiolefin derived units, and the polymer is blended with 50 to 100 phr of a filler wherein at least 5% of the 50 to 100 phr filler is precipitated silica, and not more than 10 phr of a curative package.

In one aspect of the disclosed article, the elastomeric pharmaceutical articles are vial stoppers or vial seals.

BRIEF DESCRIPTION OF THE DRAWING

The FIGURE shows the relationship between percent bound rubber verses filler in sample compounds.

DETAILED DESCRIPTION OF THE INVENTION

Applicants have determined for certain polymer compounds suitable for pharmaceutical stopper and seal applications by partially replacing calcined clay with precipitated silica, the amount of curing agents in the composition may be reduced without sacrificing the physical properties and other performance criteria, such as curing, processing, swelling, and tearing, of the compounds. The resulting elastomer will enable pharmaceutical product manufacturers to obtain stoppers that exhibit lower than conventional levels of potential extractables.

Various specific embodiments, versions and examples of the invention will now be described, including preferred embodiments and definitions that are adopted herein for purposes of understanding the claimed invention.

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the derivative form of the monomer. However, for ease of reference the phrase comprising the (respective) monomer or the like is used as shorthand. Likewise, when catalyst components are described as comprising neutral stable forms of the components, it is well understood by one skilled in the art, that the ionic form of the component is the form that reacts with the monomers to produce polymers.

Rubber refers to any polymer or composition of polymers consistent with the ASTM D1566 definition: "a material that is capable of recovering from large deformations, and can be, or already is, modified to a state in which it is essentially insoluble (but can swell) in boiling solvent . . . ". Elastomer is a term that may be used interchangeably with the term rubber.

Elastomeric composition or compounded elastomer refers to any composition comprising at least one elastomer as defined above.

A vulcanized rubber compound by ASTM D1566 definition refers to "a crosslinked elastic material compounded from an elastomer, susceptible to large deformations by a small force capable of rapid, forceful recovery to approximately its original dimensions and shape upon removal of the deforming force". A cured elastomeric composition refers to any elastomeric composition that has undergone a curing process and/or comprises or is produced using an effective amount of a curative or cure package, and is a term used interchangeably with the term vulcanized rubber compound.

The term "phr" is parts per hundred rubber or "parts", and is a measure common in the art wherein components of a composition are measured relative to a total of all of the elastomer components. The total phr or parts for all rubber components, whether one, two, three, or more different rubber components present in a given recipe is always defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percents for every component after adjusting levels of only one, or more, component(s).

Isoolefin refers to any olefin monomer having at least one carbon having two substitutions on that carbon.

Multiolefin refers to any monomer having two or more double bonds. In a preferred embodiment, the multiolefin is any monomer comprising two conjugated double bonds such as a conjugated diene like isoprene.

Isobutylene based elastomer or polymer refers to elastomers or polymers comprising at least 70 mol % repeat units from isobutylene.

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Substituted refers to at least one hydrogen group being replaced by at least one substituent selected from, for example, halogen (chlorine, bromine, fluorine, or iodine); alkyl: straight or branched chain having 1 to 20 carbon atoms which includes methyl, ethyl, propyl, isopropyl, normal butyl, isobutyl, secondary butyl, tertiary butyl, etc.; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-dibromobutyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

Elastomer

Elastomeric compositions used in the present invention comprise at least one isoolefin based polymer. These polymers are prepared by reacting a mixture of monomers, the mixture having at least (1) a $C_4$ to $C_7$ isoolefin monomer component such as isobutylene, (2) a styrene component, and optionally (3) a multiolefin monomer component. The isoolefin is in a range from 70 to 99.5 wt % of the total monomer mixture in one embodiment, and 85 to 99.5 wt % in another embodiment. The styrene component is present in the monomer mixture from 30 to 3 wt % in one embodiment, 15 to 5 wt % in another embodiment, or 10 to 7.5 wt % in yet another embodiment. When present, the multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin.

The isoolefin is a $C_4$ to $C_7$ compound, non-limiting examples of which are compounds such as isobutylene (also referred to as isobutene), 2-methyl-1-butene, 3-methyl-1-butene, 2-methyl-2-butene, 1-butene, 2-butene, hexene, and 4-methyl-1-pentene. The styrene monomer may be styrene, halostyrene such as dichlorostyrene, alkylstyrene, or haloalkylstyrene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene.

In one embodiment, the polymer in the composition is a random copolymer comprising a $C_4$ to $C_7$ isomonoolefins, such as isobutylene and an alkylstyrene comonomer, such as para-methylstyrene, containing at least 80%, more alternatively at least 90% by weight of the para-isomer and optionally include functionalized interpolymers wherein at least one or more of the alkyl substituents groups present in the styrene monomer units contain benzylic halogen or some other functional group. In another embodiment, the polymer may be a random elastomeric copolymer of ethylene or a $C_3$ to $C_6$ α-olefin and an alkylstyrene comonomer, such as para-methylstyrene ("PMS") containing at least 80%, alternatively at least 90% by weight of the para-isomer and optionally include functionalized interpolymers wherein at least one or more of the alkyl substituents groups present in the styrene monomer units contain a functional group. Up to 60 mol % of the para-substituted styrene present in the random polymer structure may be functionalized, and in another embodiment from 0.1 to 5 mol %. In yet another embodiment, the amount of functionalized structure is from 0.2 to 3 mol %.

The elastomer used in the invention is preferably functionalized by the substitution on the alky substituent group with a halogen. Halogenation typically occurs as a separate step after polymerization of the polymer. Halogenation can be carried out by any means, and the invention is not herein limited by the halogenation process. The halogen wt % is from 0.1 to 10 wt % based on the weight of the halogenated butyl rubber in one embodiment, and from 0.5 to 5 wt % in another embodiment. In yet another embodiment, the halogen wt % of the halogenated butyl rubber is from 1 to 2.5 wt %.

Alternatively, the functional group on the polymer may be some other functional group which may be incorporated by nucleophilic substitution of either the benzylic halogen or other substitution on the alkyl group pendant to the styrene derived monomer portion of the polymer. Such other functional groups include carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

In an embodiment, the elastomer comprises random polymers of isobutylene and para-methylstyrene containing from 3 to 20 mol % para-methylstyrene wherein up to 60 mol % of the methyl substituent groups present on the benzyl ring contain a bromine or chlorine atom, such as a bromine atom (para-(bromomethylstyrene)), as well as acid or ester functionalized versions thereof.

In another embodiment, the functionality is selected such that it can react or form polar bonds with functional groups present in the matrix polymer, for example, acid, amino or hydroxyl functional groups, when the polymer components are mixed at high temperatures.

In certain embodiments, the random copolymers have a substantially homogeneous compositional distribution such that at least 95% by weight of the polymer has a para-alkylstyrene content within 10% of the average para-alkylstyrene content of the polymer. Exemplary polymers are characterized by a narrow molecular weight distribution (Mw/Mn) of less than 5, alternatively less than 2.5, an exemplary viscosity average molecular weight in the range of from 200,000 up to 2,000,000 and an exemplary number average molecular weight in the range of from 25,000 to 750,000 as determined by gel permeation chromatography.

In an embodiment, brominated poly(isobutylene-co-p-methylstyrene) (BIMSM) polymers generally contain from 0.2 to 5 mol % of bromomethylstyrene groups relative to the total amount of monomer derived units in the copolymer. In another embodiment, the amount of bromomethylstyrene groups is from 0.3 to 2.8 mol %. In yet another embodiment, from 0.4 to 2.5 mol % in yet another embodiment and from 0.3 to 2.0 mol % in yet another embodiment, wherein a desirable range may be any combination of any upper limit with any lower limit. Expressed another way, exemplary polymers contain from 0.4 to 6 wt % bromine based on the total weight of the polymer, and from 0.6 to 5.6 wt % per total polymer weight in another embodiment, are substantially free of ring halogen or halogen in the polymer backbone chain.

In one embodiment, the random polymer is a polymer of $C_4$ to $C_7$ isoolefin derived units (or isomonoolefin), para-methylstyrene derived units and para-(halomethylstyrene) derived units, wherein the para-(halomethylstyrene) units are present in the polymer from 0.4 to 3.0 mol % based on the total number of monomers derived units in the polymer, and wherein the para-methylstyrene derived units are present from 3 to 20 wt % based on the total weight of the polymer in one embodiment, and from 5 to 15 wt % in another embodiment. In another embodiment, the para-(halomethylstyrene) is para-(bromomethylstyrene).

A commercial embodiment of the halogenated isobutylene-p-methylstyrene rubber ("BIMSM" rubber) of the present invention is EXXPRO™ elastomers (ExxonMobil Chemical Company, Houston, Tex.), having a Mooney viscosity (ML 1+8 at 125° C., ASTM D1646) of from 30 to 50, a p-methylstyrene content of from 5 to 7.5 wt % (measured prior to bromination of the copolymer), and a bromine content of from 0.45 to 2.2 mol % relative to the halogenated isobutylene-p-methylstyrene rubber.

The elastomer is present in the elastomeric composition in a range from up to 90 phr in one embodiment, and from up to 80 phr in another embodiment. Because of the need to control the leachables in the elastomeric composition, the inclusion of other elastomeric polymers, or secondary rubbers, is generally limited to not more than 20 phr, and in one embodiment, the amount of secondary rubber is limited to not more than 10 phr.

Processing Oils and Aids

Due to the requirement of a 'clean' elastomer and the need to restrict potential leachables in the composition, the amount of additional conventional processing oils and aids, such as plastomers and plasticizers, is very limited. At most, if present, a processing oil or aid is present in an amount of not more than 10 phr. Preferably, paraffinic, naphthenic and/or aromatic oils, as well as plastomers and other processing oils, are substantially absent from the composition; meaning, they have not been deliberately added to the compositions, or, in the alternative, if present, are only present up to 0.2 wt % of the inventive compositions.

Fillers and Curatives

Elastomeric compositions compounded for pharmaceutical applications are typically provided with one or more filler components. Calcined clay is widely used as 'clean' filler, i.e., a filler that exhibits a low level of extractables and/or leachables, by the pharmaceutical industry. The fillers are typically present at a level of from 10 to 100 phr of the blend, more preferably from 30 to 80 phr in another embodiment, and from 50 to 80 phr in yet another embodiment.

In accordance with the present invention, it has been determined that at least a part of the filler may be precipitated silica wherein the precipitated silica contains surface silanol groups. At least 5% of the total amount of filler, based on the total phr of the filler in the compound, is precipitated silica. In another embodiment, at least 10% of the total filler in the compound is precipitated silica. In another embodiment, at least 30% of the total filler is precipitated silica. In yet another embodiment, 5 to 80% of the total filler amount is precipitated silica. In yet another embodiment, 10 to 60% of the total filler amount is precipitated silica. The total amount of filler in the composition range from 50 to 100 phr of the total composition.

In any of these embodiments, the remaining amount of filler, based on the total phr of the filler in the compound, is a calcined clay. Both calcined clay and precipitated silica are distinct from nanoclay and layered silicates. Calcined clay is a layered clay that has been heat treated to remove all volatiles from the clay layers, rendering the clay inert. A nanoclay is a broad category of layered clays that have thin layers and spacing between the layers in the nanoscale range. The layers of the nanoclay are held together by ionic forces due to naturally occurring sodium charges on the layer surfaces. Layered silicates are a generally a type of layered material wherein the layers contain a silicon bearing ion, i.e., silicate materials. Precipitated silica is a material comprising silicon dioxides and is prepared by reacting an alkaline silicate solution with a mineral acid; typically sulfuric acid and sodium silicate solution are agitated in water and, under alkaline conditions, silica is precipitated from the solution. The properties of the precipitated silica may vary depending on the different process conditions such as temperature, pH, addition rate of reactants.

One or more crosslinking agents are preferably used in the elastomeric compositions of the present invention. The absence of double bonds along the backbone of the elastomer and the presence of the alkylstyrene derived monomer pendant to the elastomer backbone, as well as the need in the pharmaceutical industry to limit leachables in the composition, are factors in selecting appropriate curing agents for the BIMSM.

Resin cure systems may also be used, with or without accelerators and/or activators. Accelerators serve to control the onset of and rate of vulcanization, and the number and type of crosslinks that are formed. Activators are chemicals that increase the rate of vulcanization. General classes of accelerators include amines, diamines, guanidines, thioureas, thiazoles, thiurams, sulfenamides, sulfenimides, thiocarbamates, xanthates, and the like.

Halogen-containing elastomers such as the halogenated poly(isobutylene-co-p-methylstyrene) may be crosslinked by their reaction with metal oxides. The metal oxide is thought to react with halogen groups in the polymer to produce an active intermediate which then reacts further to produce carbon-carbon bonds. Zinc halide is liberated as a by-product and it serves as an autocatalyst for this reaction. In particular, the following metal oxides are common curatives that will function in the present invention: ZnO, CaO, MgO, $Al_2O_3$, $CrO_3$, FeO, $Fe_2O_3$, and NiO. These metal oxides can be used alone or in conjunction with the corresponding metal fatty acid complex (e.g., zinc stearate, calcium stearate, etc.), or with the organic and fatty acids added alone, such as stearic acid or salicylic acid, an alkylperoxide compound, diamines or derivatives thereof.

Processing

Elastomer blends are typically melt mixes wherein mixing of the components may be carried out by combining the polymer components, filler and other additives in any suitable mixing device such as a two-roll open mill, Brabender™ internal mixer, Banbury™ internal mixer with tangential rotors, Krupp internal mixer with intermeshing rotors, or preferably a mixer/extruder, by techniques known in the art. Typically, from 70% to 100% of the elastomer is first mixed for 20 to 90 seconds, or until the temperature reaches from 40° C. to 75° C. Then, ¾ of the filler, and the remaining amount of elastomer, if any, is typically added to the mixer, and mixing continues until the temperature reaches from 90° C. to 150° C. Next, the remaining filler is added, as well as the processing oil, and mixing continues until the temperature reaches from 140° C. to 190° C. The masterbatch mixture is then finished by sheeting on an open mill and allowed to cool, for example, to from 60° C. to 100° C. when the curatives are added.

The cure agents such as phenolic resins, sulfur, stearic acid, and zinc oxide, may be present from 0.1 to 10 phr.

Examples

Without wishing to be bound by this theory, it is believe that the surface silane groups on the precipitated silica form strong interactions/bonds with the benzylic halogen of a halogenated elastomer comprising styrenic derived units. To test this theory, BIMSM polymers and conventional butadiene polymers were blended with different fillers and then dissolved in toluene at room temperature for one week and then the amount of bound rubber was determined; strong interaction between the polymer and filler is evidenced by a high bound rubber content. FIG. 1 shows the percent bound rubber verses the amount (in volume %) of filler in the compound. For the compounds blended with carbon black, the amount of bound rubber is relatively flat, regardless of the amount of filler added or the type of polymer matrix. For the butadiene/precipitated silica blend, the amount of bound rubber gradually increased with volume % of filler, but only achieved 32% bound rubber when the compound had 20 vol % silica content. For the single mixture of non-halogenated isobutylene-paramethylsytrene polymer, when blended with precipitated silica, the amount of bound rubber is zero, indicating that without benzylic halogen there will be no interaction of the polymer with silica. In the BIMSM/silica blends, the amount of bound rubber is increased as the amount of silica is increased and achieved 66% bound rubber for a compound with
20 vol % silica content. This increase in bound rubber for the BIMSM/silica blend will greatly enhance physical performance of the compound and enables a reduction in the amount of curatives used in the compound; as residual curatives are a potential source of leachables in the compounds, reduced amounts of curatives are preferred.

Eight elastomeric compositions were also prepared wherein the filler amounts and type and amounts of cure agents were varied. Comparative compositions have alphabetical identifiers; compositions within the scope of the present invention have numerical identifiers. The compositions are set forth in Table 1 below; all components are expressed in parts per hundred (phr).

TABLE 1

|  | A | 1 | B | 2 | C | 3 | D | 4 |
|---|---|---|---|---|---|---|---|---|
| BIMSM[1] | 100 | 100 | 100 | 100 | 100 | 100 | 100 | 100 |
| Calcined Clay | 80 | 40 | 80 | 40 | 80 | 40 | 80 | 40 |
| Silica |  | 30 |  | 30 |  | 30 |  | 30 |
| carbamate[2] | 0.75 | 0.75 |  |  |  |  |  |  |
| carbamate[3] |  |  | 1.0 | 0.25 |  |  |  |  |
| ZnO |  |  |  |  | 0.5 | 0.25 | 2 | 1 |
| resin[4] |  |  |  |  |  |  | 2 | 1 |
| Stearic acid |  |  |  |  |  |  | 2 | 1 |
| Salicylic acid |  |  |  |  | 1 | 0.5 |  |  |

[1]Mooney Viscosity of 35 ± 5 ML1 + 8 @ 125° C., 5 wt % PMS, 0.75 mol % bromine
[2]diamine carbamate
[3]methylene bis(cyclohexylamine) carbamate
[4]octyphenol formaldehyde resin The physical properties of these eight compounds were tested. When possible, standard ASTM tests were used to determine the cured compound physical properties (see Table 2). Stress/strain properties (tensile strength, elongation at break, modulus values) were measured at room temperature using an Instron 4202 or an Instron Series IX Automated Materials Testing System 6.03.08. Tensile measurements were done at ambient temperature on specimens (dog-bone shaped) width of 0.25 inches (0.62 cm) and a length of 1.0 inches (2.5 cm) length (between two tabs) were used. The thickness of the specimens varied and was measured manually by Mitutoyo Digimatic Indicator connected to the system computer. The specimens were pulled at a crosshead speed of 20 inches/min. (51 cm/min.) and the stress/strain data was recorded. The average stress/strain value of at least three specimens is reported. The error (2 σ) in Tensile measurements is ±0.47 MPa units. The error (2 σ) in measuring 100% Modulus is ±0.11 MPa units; the error (2 σ) in measuring Elongation is ±13% units.

TABLE 2

Test Methods

| Parameter | Units | Test |
|---|---|---|
| Mooney Viscosity (composition) | ML 1 + 4, 100° C., MU | ASTM D1646 |
| Moving Die Rheometer (MDR) @180° C., ±0.5° arc, 30 mins | | |
| ML | deciNewton.meter | ASTM D5289 |
| MH | dNewton.m | |
| ts2 | minutes | |
| t90 | minutes | |
| Physical Properties, press cured Tc 90 + 2 min @ 160° C. | | |
| Hardness | Shore A | ASTM D2240 |
| Modulus 100%, 300% | MPa | ASTM D412 die C |
| Tensile Strength | MPa | |
| Elongation at Break | % | |
| Tear Resistance | MPa | ASTM D624 die C |

The results of the testing are set forth in Table 3 below.

TABLE 3

| | A | 1 | B | 2 | C | 3 | D | 4 |
|---|---|---|---|---|---|---|---|---|
| Mooney viscosity (MU) | 87.9 | 140.2 | 87.6 | 132.7 | 76.4 | 130.9 | 66.5 | 114.6 |
| ML, dNm | 2.09 | 5.23 | 1.95 | 5.54 | 1.80 | 4.98 | 1.18 | 3.73 |
| MH, dNm | 7.63 | 7.58 | 7.38 | 7.56 | 11.17 | 10.49 | 7.99 | 7.14 |
| MH – ML | 5.54 | 2.35 | 5.43 | 2.02 | 9.37 | 5.51 | 6.81 | 3.41 |
| Ts2 (mins) | 1.58 | 14.52 | 2.84 | 29.11 | 1.2 | 2.19 | 1.3 | 3.24 |
| Tc90 (mins) | 9.64 | 19.03 | 12.62 | 21.55 | 14.21 | 21.03 | 12.43 | 17.83 |
| Share A Hardness | 46.4 | 58.4 | 46.5 | 57.6 | 54 | 59.9 | 47.1 | 60.0 |
| 100% Modulus, MPA | 1.1 | 2.1 | 1.1 | 1.8 | 2.2 | 2.1 | 1.1 | 2.0 |
| 300% Modulus, MPA | 2.1 | 3.3 | 2.1 | 2.9 | 4.5 | 4.0 | 1.7 | 3.6 |
| Tensile MPa | 4.4 | 3.3 | 4.1 | 2.9 | 4.8 | 4.4 | 3.2 | 4.3 |
| Elongation at Break % | 838.4 | 455.7 | 887.8 | 591.1 | 420.5 | 542.8 | 694.1 | 567.3 |
| tear strength, MPa | 18.3 | 26.3 | 19.2 | 23.6 | 20.1 | 29.8 | 14.7 | 28.2 |
| Compression Set, % | 24 | n/a | 22 | n/a | 16 | 64 | 23 | 64 |
| Swelling % reflux in H$_2$O, 3 hours | 0.49 | 1.46 | 0.24 | 1.23 | 0.67 | 0.7 | 0.55 | 1.36 |

The cure and physical properties of the four comparative and four inventive compositions of Table 1 show that a partial replacement of the conventional calcined clay with precipitated silica permits the reduction of amount of carbamate curatives without significantly affecting the physical properties; see compounds 1 and 2 in comparison to compounds A and B.

The same can be said for the two zinc oxide based cure systems. In the inventive compounds 3 and 4, a reduction of the curatives by 50% or more does not seem to impact the physical properties of the compound. It is also observed that curing is somewhat slower for the low cure formulation as evidenced by longer ts2 and Tc90; while this indicates a longer cure time for the compounds, it has the benefit of reducing the scorchiness of the compound during curing. Surprisingly, there is very little swelling when the low cure compound is subjected to reflux at boiling water for 3 hours. This ensures good dimension stability of the low cure stopper when subjected to steam sterilization.

Additional examples were prepared with a different BIMSM polymer having an increased Mooney Viscosity and higher amounts of methylstyrene and bromine in the polymer. Four comparative examples were prepared, compounds E to H and six compounds according to the invention were prepared, compounds 5 to 10. In two of the compounds, a plasticizer was added to determine the effects when using the higher Mooney Viscosity polymer.

TABLE 4

|  | E | 5 | 6 | F | 7 | 8 | G | 9 | H | 10 |
|---|---|---|---|---|---|---|---|---|---|---|
| BIMSM[5] | 100 | 100 | 100 | 100 | 100 | 100 | 100 | 100 | 100 | 100 |
| Calcined clay | 80 | 40 | 40 | 80 | 40 | 40 | 80 | 40 | 80 | 40 |
| Silica |  | 30 | 30 |  | 30 | 30 |  | 30 |  | 30 |
| Plasticizer |  |  | 6 |  |  | 6 |  |  |  |  |
| Carbamate[6] | 0.75 | 0.4 | 0.4 |  |  |  |  |  |  |  |
| Carbamate[7] |  |  |  | 1.0 | 0.5 | 0.5 |  |  |  |  |
| ZnO |  |  |  |  |  |  | 0.5 | 0.25 | 2 | 1 |
| Resin[8] |  |  |  |  |  |  |  |  | 2 | 1 |
| Stearic acid |  |  |  |  |  |  |  |  | 2 | 1 |
| Salicylic acid |  |  |  |  |  |  | 1 | 0.5 |  |  |

[5]Mooney Viscosity of 45 ± 5 ML1 + 8 @125° C., 7.5 wt % PMS, 1.2 mol % bromine
[6]diamine carbamate
[7]methylene bis(cyclohexylamine) carbamate
[8]octyphenol formaldehyde resin The physical properties of the compounds were tested. The results of the testing are set forth in Table 5.

TABLE 5

|  | E | 5 | 6 | F | 7 | 8 | G | 9 | H | 10 |
|---|---|---|---|---|---|---|---|---|---|---|
| Mooney viscosity (MU) | 130.7 | 119.3 | 107.2 | 107.6 | 110.2 | 101.7 | 89.8 | 112.7 | 84.3 | 106.3 |
| ML, dNm | 4.1 | 7.25 | 3.27 | 3.42 | 6.49 | 5.84 | 2.84 | 3.23 | 2.06 | 5.41 |
| MH, dNm | 9.18 | 9.68 | 8.46 | 8.91 | 8.12 | 7.04 | 12.39 | 12.51 | 14.17 | 13.79 |
| MH − ML | 5.08 | 2.43 | 5.19 | 5.49 | 1.63 | 1.2 | 9.55 | 9.28 | 12.11 | 8.38 |
| Ts2 (mins) | 1.24 | 9.77 | 0.08 | 1.85 | n/a | n/a | 1.2 | 0.09 | 0.89 | 2.98 |
| Tc90 (mins) | 5.35 | 15.60 | 5.84 | 7.99 | 12.54 | 9.14 | 13.36 | 16.42 | 1.79 | 24.75 |
| Share A Hardness | 53.3 | 60.3 | 56 | 52.6 | 58.2 | 55.3 | 55.7 | 62 | 58.4 | 63.4 |
| 100% Modulus, MPA | 1.7 | 2.1 | 1.7 | 1.6 | 1.8 | 1.6 | 2.5 | 2.2 | 1.9 | 3.0 |
| 300% Modulus, MA | 3.3 | 3.0 | 2.1 | 3.3 | 2.4 | 1.9 | 4.6 | 5.0 | 3.0 | 6.2 |
| Tensile strength, MPa | 3.9 | 3.0 | 2.1 | 4.3 | 2.4 | 1.9 | 4.7 | 5.4 | 3.0 | 9.2 |
| Elongation at Break % | 512.7 | 605.7 | 621.5 | 665.6 | 755.8 | 798.7 | 331.8 | 504.5 | 310.2 | 489.1 |
| Compression Set, % | 34.0 | n/a | n/a | 23.0 | n/a | n/a | 10.0 | 62.0 | 23.0 | 28.0 |

Table 5 shows the use of a higher Mooney and higher bromine content polymer increases the Mooney viscosity for the 100% calcined clay filled high cure compounds as can be expected. Surprisingly, the Mooney viscosity for the mixed filler compounds of the invention exhibit lower Mooney viscosity values; comparable to the mixed filler compounds containing the lower mooney BIMSM. This is beneficial for the stopper manufacturing process. The higher bromine BIMSM polymers further reduce the silica filler network in the compound. The use of plasticizer further brings down the Mooney viscosity. The mixed filler, higher Mooney Viscosity BIMSM based compounds have a faster cure rate when compared to similar lower Mooney Viscosity BIMSM based compounds.

Thus, the application discloses the following embodiments:

A. An elastomeric composition, the composition comprising a halogenated polymer, the halogenated polymer prepared by reacting a mixture of i) a $C_4$ to $C_7$ isoolefin monomer, ii) a styrene based monomer, and optionally iii) a $C_4$ to $C_{14}$ multiolefin monomer, wherein the polymer contains 5 to 15 wt % of styrene derived units, and 50 to 100 phr filler, wherein at least 5% of the total filler, based on the phr amount of the filler, is precipitated silica;

B. The elastomeric composition of embodiment A, wherein the precipitated silica comprises silanol groups;

C. The elastomeric composition of embodiment A or B, wherein the amount of precipitated silica in the total amount of filler is selected from the group consisting of 1) at least 10%, 2) at least 30%, 3) 5 to 80%, and 4) 10 to 60%;

D. The elastomeric composition of one or combination of embodiments A to C, wherein the filler further comprises a calcined clay.

E. The elastomeric composition of any one or combination of embodiments A to D, wherein the elastomeric compound is further comprised of a cure package;

F. The elastomeric composition of any one or combination of embodiments A to E, wherein the elastomeric compound is further comprised of a cure package comprising carbamate, wherein the carbamate is present in amounts selected from the group consisting of 1) not more than 2.0 phr, 2) less than 1.0 phr, and 3) 0.10 to 0.25 phr;

G. The elastomeric composition of any one or combination of embodiments A to F, wherein the composition further comprises a plasticizer;

H. The elastomeric composition of any one or combination of embodiments A to G, wherein the polymer is halogenated with either bromine or chlorine;

I. The elastomeric composition of any one or combination of embodiments A to H, wherein the multiolefin is present in the reaction mixture in an amount of 15 to 0.5 wt %;

J. The elastomeric composition of any one or combination of embodiments A to I, wherein the styrene based monomer is present in the reaction mixture in an amount of 10 to 7.5 wt %;

K. The elastomeric composition of any one or combination of embodiments A to J, wherein the isoolefin is selected from the group consisting of isobutylene, 2-methyl-1-butene, 3-methyl-1-butene, 2-methyl-2-butene, 1-butene, 2-butene, hexene, and 4-methyl-1-pentene;

L. The elastomeric composition of any one or combination of embodiments A to K, wherein the styrene monomer is selected from the group consisting of styrene, halostyrene, alkylstyrene, and haloalkylstyrene;

M. The elastomeric composition of any one or combination of embodiments A to L, wherein the multiolefin is selected from the group consisting of isoprene, butadiene, 2,3-dimethyl-1,3-butadiene, myrcene, 6,6-dimethyl-fulvene, hexadiene, cyclopentadiene, and piperylene;

N. The elastomeric composition of any one or combination of embodiments A to M, wherein the styrene monomer is a functionalized alkylstyrene;

O. An article formed of an elastomeric composition of any one or combination of embodiments A to N;

P. A method of reducing the amount of leachables in an elastomeric pharmaceutical composition, the method comprising blending a halogenated polymer, the polymer comprising i) $C_4$ to $C_7$ isoolefin derived units ii) 5 to 15 wt % para-methylstyrene derived units, and optionally iii) a $C_4$ to $C_{14}$ multiolefin derived units, 50 to 100 phr of filler, and less than 10 phr of a curative package, wherein at least 5% of the total filler is precipitated silica;

Q. The method of reducing leachables in accordance with embodiment P, wherein the filler further comprises a calcined clay;

R. The method of either embodiment P or Q wherein the amount of curative is less than 5 phr, or less than 2 phr, or less than 1 phr;

S. The method of any one or combination of embodiments P to R, wherein the polymer is halogenated with either bromine or chlorine;

T. The method of any one or combination of embodiments P to S, wherein the multiolefin is present in the polymer in an amount of 15 to 0.5 wt %;

U. The method of one or combination of embodiments P to T, wherein the isoolefin is selected from the group consisting of isobutylene, 2-methyl-1-butene, 3-methyl-1-butene, 2-methyl-2-butene, 1-butene, 2-butene, hexene, and 4-methyl-1-pentene; and V. The method of any one or combination of embodiments P to U, wherein the multiolefin is selected from the group consisting of isoprene, butadiene, 2,3-dimethyl-1,3-butadiene, myrcene, 6,6-dimethyl-fulvene, hexadiene, cyclopentadiene, and piperylene.

What is claimed is:

1. An elastomeric composition, the composition comprising:
   a halogenated polymer, the halogenated polymer consisting of i) C4 to C7 isoolefin monomer derived units, ii) non-functionalized alkylstyrene derived units, and iii) halogen functionalized alkylstyrene derived units, wherein the halogenated polymer contains 5 to 15 wt % of alkylstyrene derived units,
   a cure package, and
   50 to 100 phr of filler,
   the composition being characterized by 10 to 60% of the total filler, based on the total phr of the filler in the composition, is precipitated silica and the remaining amount of filler is calcined clay and the cure package is present in amounts of 0.1 to 5 phr.

2. The elastomeric composition of claim 1, wherein the precipitated silica comprises silanol groups.

3. The elastomeric composition of claim 1, wherein the cure package comprises a carbamate or a metal oxide.

4. The elastomeric composition of claim 1, wherein the cure package comprises a carbamate, the carbamate being present in amounts of not more than 2.0 phr.

5. The elastomeric composition of claim 1, wherein the elastomeric composition further comprises a plasticizer.

6. The elastomeric composition of claim 1, wherein the polymer is halogenated with either bromine or chlorine.

7. The elastomeric composition of claim 1, wherein the alkylstyrene derived units are present in the halogenated polymer in an amount of 7.5 to 10 wt %.

8. The elastomeric composition of claim 1, wherein the isoolefin is selected from the group consisting of isobutylene, 2-methyl-1-butene, 3-methyl-1-butene, 2-methyl-2-butene, 1-butene, 2-butene, hexene, and 4-methyl-1-pentene.

9. An article formed of the composition of claim 1.

10. The article of claim 9, wherein the article is a vial stopper or a vial seal.

* * * * *